United States Patent
André et al.

(10) Patent No.: US 9,929,782 B2
(45) Date of Patent: Mar. 27, 2018

(54) METHOD AND ARRANGEMENT FOR PHASE CALIBRATION OF TRANSMIT AND/OR RECEIVE PATHS OF AN ANTENNA ARRAY

(71) Applicant: TELEFONAKTIEBOLAGET L M ERICSSON (PUBL), Stockholm (SE)

(72) Inventors: Tore Mikael André, Älvsjö (SE); Peter Deane, Fitzroy Harbour (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 237 days.

(21) Appl. No.: 14/777,386

(22) PCT Filed: Mar. 20, 2013

(86) PCT No.: PCT/SE2013/050309
§ 371 (c)(1),
(2) Date: Sep. 15, 2015

(87) PCT Pub. No.: WO2014/148958
PCT Pub. Date: Sep. 25, 2014

(65) Prior Publication Data
US 2016/0049995 A1 Feb. 18, 2016

(51) Int. Cl.
*H04B 7/00* (2006.01)
*H04B 7/04* (2017.01)
(Continued)

(52) U.S. Cl.
CPC ............ *H04B 7/04* (2013.01); *H01Q 3/2605* (2013.01); *H01Q 3/267* (2013.01); *H01Q 21/24* (2013.01);
(Continued)

(58) Field of Classification Search
CPC .......... H04B 7/04; H04B 17/14; H04B 17/21; H01Q 3/2605; H01Q 21/24; H04L 5/14
See application file for complete search history.

(56) References Cited

U.S. PATENT DOCUMENTS 5,867,123 A * 2/1999 Geyh ..................... H01Q 3/267
  342/173
8,199,048 B1 * 6/2012 Medina Sanchez .. G01S 7/4004
  342/174

(Continued)

FOREIGN PATENT DOCUMENTS

CN          201392888 Y     1/2010
GB          2436399 A       9/2007

(Continued)

OTHER PUBLICATIONS

Samsung, Remaining details on evaluation assumptions for 3D channel modeling, 3GPP TSG RAN WG1 Meeting #74 R1-133116, Barcelona, Spain, Aug. 19-23, 2013.

*Primary Examiner* — Ping Hsieh

(57) ABSTRACT

A method of calibrating transmit and/or receive paths of an antenna comprising at least two antenna columns, each of which comprising two co-located sub-arrays of antenna elements. The method includes the steps of transmitting a measurement signal on at least one of the antenna elements, and receiving a representation of the measurement signal on at least one other of the antenna elements, the representation comprising at least a mutual coupling component dependent on the mutual coupling between the at least one antenna element and the at least one other antenna element. Further, the method includes the steps of repeating the transmitting and receiving step for at least a subset of all combinations of antenna elements of the antenna, wherein each combination of antenna elements comprises antenna elements having a same or different polarization, and subsequently comparing (Continued)

the received representations of the measurement signal between different combinations of antenna elements, and estimating at least a respective phase difference between antenna elements with the same polarization based on the comparison. Finally, the method includes the step of calibrating transmit and/or receive paths of antenna elements with the same polarization based on the estimated phase difference.

16 Claims, 8 Drawing Sheets

(51) Int. Cl.
*H01Q 3/26* (2006.01)
*H04B 17/14* (2015.01)
*H04B 17/21* (2015.01)
*H01Q 21/24* (2006.01)
*H04L 5/14* (2006.01)

(52) U.S. Cl.
CPC ............ *H04B 17/14* (2015.01); *H04B 17/21* (2015.01); *H04L 5/14* (2013.01)

(56) References Cited

U.S. PATENT DOCUMENTS

| 2012/0033759 A1* | 2/2012 | Goransson | H01Q 3/267 375/296 |
| 2012/0139776 A1* | 6/2012 | Malmqvist | H01Q 3/267 342/174 |

FOREIGN PATENT DOCUMENTS

| JP | 2009194808 A | 8/2009 |
| WO | 2013187811 A1 | 12/2013 |

* cited by examiner

US 9,929,782 B2

METHOD AND ARRANGEMENT FOR PHASE CALIBRATION OF TRANSMIT AND/OR RECEIVE PATHS OF AN ANTENNA ARRAY

This application is a 371 of International Application No. PCT/SE2013/050309, filed Mar. 20, 2013, the disclosure of which is fully incorporated herein by reference.

TECHNICAL FIELD

The present invention relates to antenna arrays in general, and specifically to phase calibration of transmit and/or receive paths in such arrays.

BACKGROUND

Within the field of cellular communications, the increasing demand for capacity has resulted in increased use of more advanced antenna technologies. In particular, the use of so-called antenna arrays or array antennas has received increasing research activity. An antenna array is typically a group of similar antenna, elements, or antenna sections, that are arranged in various configurations with proper amplitude and phase relations in order to give certain desired radiation capabilities. The direction and shape of the antenna beam is determined by weighting each column signal with appropriate phase and amplitude factors. A receiving and transmitting antenna array comprises a number of receiving and transmitting antenna sections, and each transmitting or receiving path includes components e.g. feeder cables, beam formers, filters, radio units etc. that can distort the phase and amplitude of received and/or transmitted signals. In order to accurately shape and direct the antenna beams, these receiving and transmitting antenna arrays need to be accurately calibrated, such that any distortion of phase and amplitude, or time delay, of signals are corrected before transmission and after reception of the signals.

If several antennas with a same polarization are used, usually the antenna signals have to have a well-defined phase relationship. In order to ensure this, each radio path must be calibrated against the other paths with respect to phase. Different antenna branches can e.g. have slightly different feeder lengths, which affect the phase of the antenna branch. The internal analog filters might also be different. The differences can be temperature dependent and will change over time. This makes continuous calibration of the transmitter and in some cases receiver paths necessary. The characteristics will change slowly, so the calibration can be done with a low repetition rate.

Typically, the calibration procedure will calibrate a combination of a radio and the connected antenna (and the connecting feeder cable or network) and consists of several steps.

Measurement and calculation of relative transfer function between branches.
 Calculation of compensation coefficients.
 Applying coefficients and performing the compensation.

One known manner in which to calibrate the phase of the antenna elements in an antenna array is to include a dedicated calibration coupler unit (CCU) which is built into the antenna, see FIG. 1. As illustrated in FIG. 1, a base band processing unit is connected to a radio unit via the CPRI interface. In the example four antennas (A0, . . . , A3) are connected to the radio, and the CCU is connected to each antenna. The CCU provides a calibration input/output for calibration measurements. When performing measurements on the downlink (DL), the CCU is used to provide a phase accreted connection to all antennas. The signals from all antennas are added and sent into a calibration receiver. The CCU itself is calibrated in advance. In addition, the radio e.g. transceiver units, may contain special hardware (HW) dedicated to support calibration measurements.

In other antennas, e.g. most four-antenna systems, no CCU is available. One possible solution would be to connect an external CCU unit to the antenna. Another possibility would be to include the CCU into a TMA. A further possibility would be to incorporate the CCU into the radio transceiver. However, in this case the feeders connecting the transceiver and the antennas would need to be matched and very phase stable. Since the feeder cables are not part of the calibration loop, the phase error would be large. As an example, for a 2 mm difference in feeder length, the phase error would typically be 10 degrees for a GHz system.

Consequently, there is a need for an improved method of phase calibrating the respective transmit and/or receive paths of antenna elements of an antenna array without necessitating a CCU in the system.

SUMMARY

The present invention relates to a method and an arrangement for phase calibrating transmit and/or receive paths of antenna elements of an antenna array.

According to a first aspect, the current disclosure presents a method of calibrating transmit and/or receive paths of an antenna comprising at least two antenna columns, each of which comprising two co-located sub-arrays of antenna elements, one sub-array comprising at least one antenna element with a first polarization and one sub-array comprising at least one antenna element with a second polarization, and each said antenna element being connected to a respective transceiver device via a respective feeder network. The method includes the steps of transmitting a measurement signal on at least one of the antenna elements, and receiving a representation of the measurement signal on at least one other of the antenna elements. The representation comprising at least a mutual coupling component dependent on the mutual coupling between the at least one antenna element and the at least one other antenna element. The transmitting and receiving step are repeated for at least a subset of all combinations of antenna elements of the antenna, wherein each combination of antenna elements comprises antenna elements having a same or different polarization. Further, the method includes comparing the received representations of the measurement signal between different combinations of antenna elements, and estimating at least a respective phase difference between antenna elements with the same polarization based on the comparison. Finally, the method includes the step of calibrating transmit and/or receive paths of antenna elements with a same polarization based on the estimated phase difference.

According to a second aspect the present disclosure includes an arrangement for calibrating transmit and/or receive paths of an antenna comprising at least two antenna columns, each of which comprising two co-located sub-arrays, one sub-array comprising a first antenna element with a first polarization and one sub-array comprising a second antenna element with a second polarization, and each such antenna element is connected to a respective transceiver device in a network node via a respective feeder network. Within the arrangement each transceiver device includes a transmit unit that is configured for transmitting a measurement signal on at least one of the antenna elements, and each transceiver device includes a receiver unit that is configured for receiving a representation of the measurement signal on at least one other of the antenna elements. The representation comprising at least a mutual coupling component dependent on the mutual coupling between the at least one antenna element and the at least one other antenna element, wherein the transmitting unit and the receiving unit are configured for repeating the transmitting and receiving step for at least a subset of all combinations of antenna elements of the antenna array, wherein each combination of antenna elements comprises antenna elements having a same or different polarization. Further, the arrangement includes a comparing unit configured for comparing the received representations of the measurement signal, and an estimating unit configured for estimating a respective phase difference between antenna elements with the same polarization based on the comparison. Finally, the arrangement includes a calibrating unit configured for calibrating transmit and/or receive paths of antenna elements with the same polarization based on the estimated phase difference.

Additional aspects include a network node comprising the arrangement and implementing the method.

Advantages of the current disclosure include that calibration is possible for antennas without a calibration port and without an external CCU. No phase stable feeder cables are required. A minimum of extra hardware is required in the radio.

BRIEF DESCRIPTION OF THE DRAWINGS

The invention, together with further objects and advantages thereof, may best be understood by referring to the following description taken together with the accompanying drawings, in which.

ABBREVIATIONS

CCU Calibration Coupler Unit
DL Down Link
FDD Frequency Division Duplexing
HW Hardware
LNA Low Noise Amplifier
LO Local Oscillator
PA Power Amplifier
TDD Time Division Duplexing
TMA Tower Mounted Amplifier
UL Up Link

DETAILED DESCRIPTION

The present disclosure concerns phase calibration in antenna arrays. Although the disclosure focuses on four-element antenna cross-polarized antennas, it is equally applicable to larger antenna arrays. For four-element antenna systems, only downlink calibration is required. It is usually only necessary to compensate the phase such that antennas or antenna elements with a same polarization have a same phase. Calibration has so far been used mainly in TDD systems, but in the future, it will be needed also in FDD systems, in particular for systems with at least four-antenna elements.

In order to simplify the understanding of the present disclosure, a description of the terminology used will follow below with reference to FIG. 2.

Figure 2:
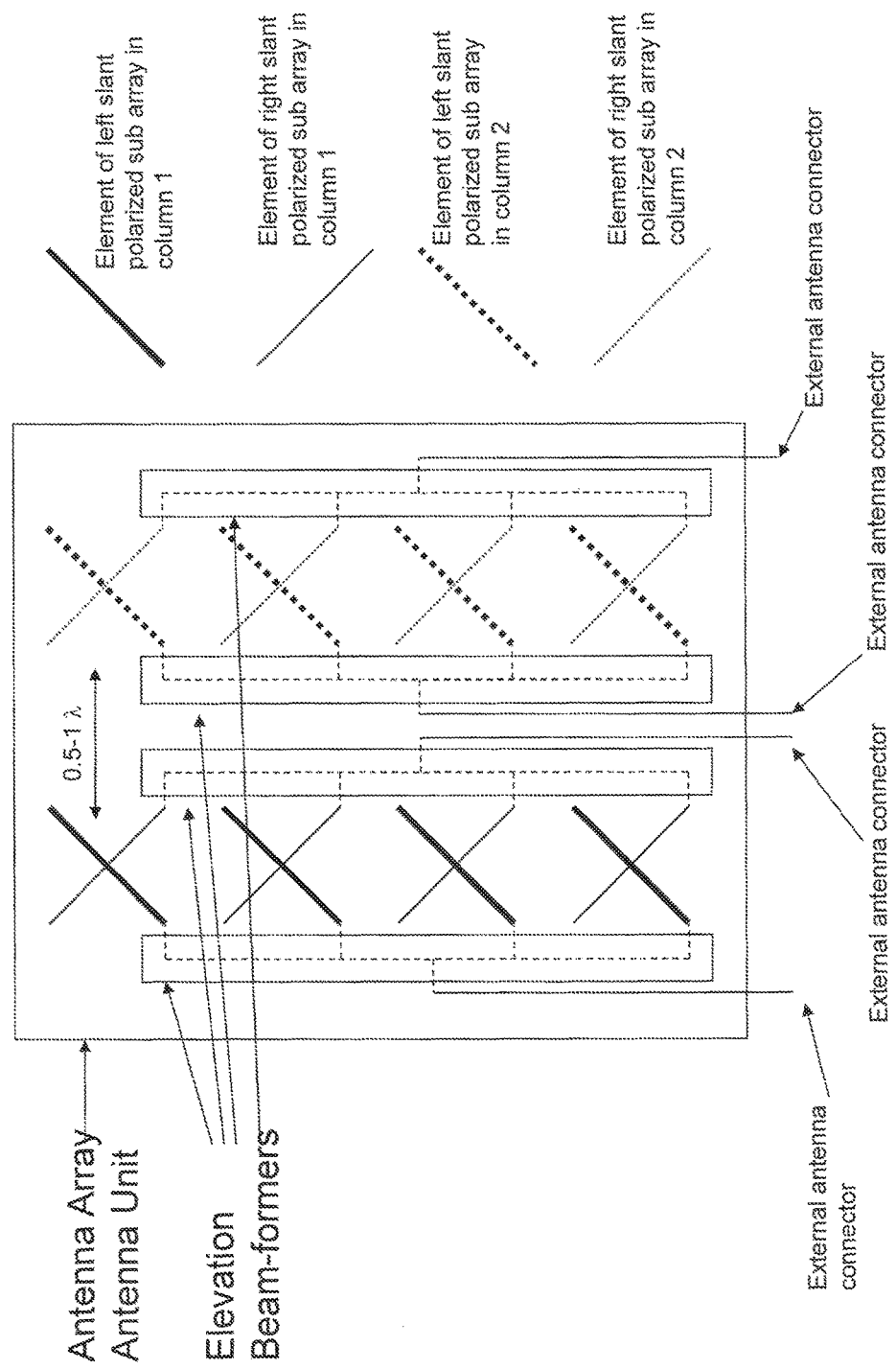
FIG. 2 illustrates an antenna arrangement for which the present disclosure can be implemented.

In FIG. 2, an antenna or antenna array, in which the present disclosure can be beneficially implemented, is disclosed. The antenna is a two-column antenna, in which the radiating antenna elements are arranged in two columns. Each column includes two co-located sub-arrays of antenna elements. The antenna elements of the co-located sub-arrays are orthogonally polarized in relation to each other. This could also be viewed as two columns of dual polarized or cross-polarized antenna elements in which each dual polarized antenna elements includes a first antenna element polarized according to a first polarization and a second co-located antenna element polarized according to a second orthogonal polarization. The respective elements of each sub-array of each column are connected to a respective external antenna connector via a respective elevation beam former. In other words, all first polarization elements of the first column are connected to one elevation beam former, and all second polarization elements of the first column are connected to another elevation beam former, and similarly for the second column. Elevation beam formers typically control the antenna beam in the vertical direction. The external connectors are connected to respective transceivers units in a network node e.g. a base station or similar, in order to enable transmission and reception of signals from and to the node via the antenna elements of the antenna or antenna array.

The present disclosure further exploits the presence of mutual coupling between antenna elements. Mutual coupling is the transfer function between antenna elements within one antenna unit. It refers to the electromagnetic interactions between elements of an antenna array. Some of the energy transmitted by a transmit antenna is transferred to the other elements. Correspondingly, a portion of the energy in the incident field of a receive antenna element is transferred to the nearby elements. As a result the feed current on each transmit antenna in an antenna array does not solely consist of the current as when they are transmitting in isolation, but also of the current induced by the other antenna elements in the proximity. The same argument follows for the induced current on the received element of the array. The amount of mutual coupling depends on the separation between antenna elements and increases the closer the antenna elements are to each other. It has been shown that for minimum or no mutual coupling, the element separation has to be at least half a wavelength. The extent of mutual coupling also depends on the element radiation patterns and the array geometry, for example the relative orientation and location of the antenna elements.

Figure 1:
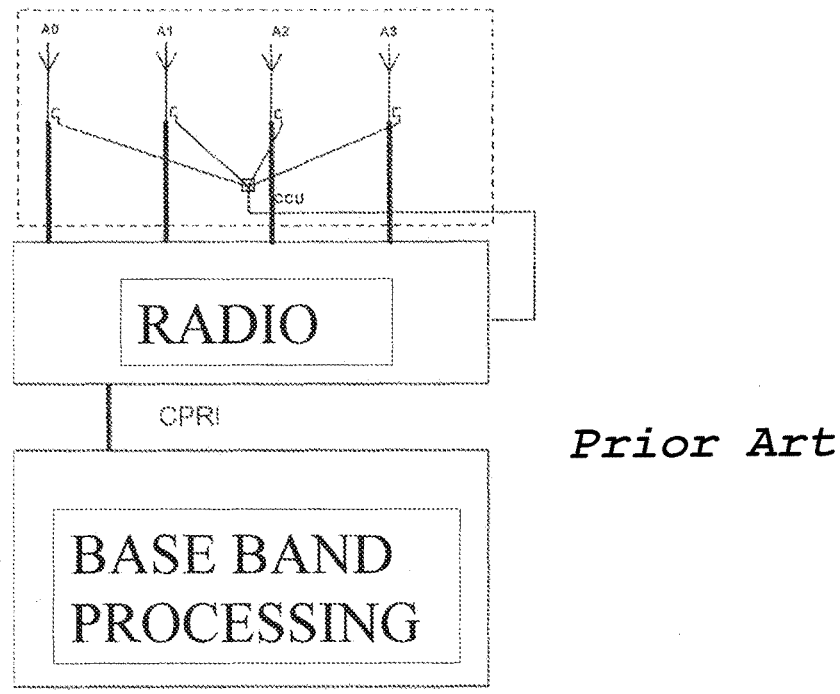
FIG. 1 is a known CCU for calibrating a four element antenna.
Figure 3:
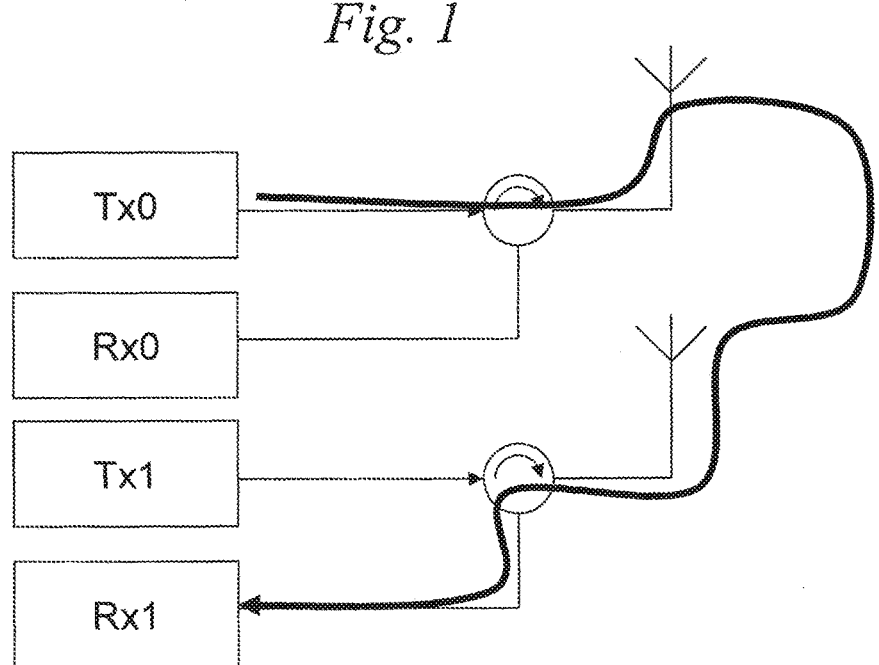
FIG. 3 illustrates the signal path of an embodiment of the current disclosure.

In most large antenna arrays, the antenna is typically designed to minimize or completely remove the mutual coupling between elements. However, for smaller antenna arrays e.g. four-element antennas this is usually not the case. The inventors have identified a method of utilizing (directly or indirectly) the mutual coupling between the antenna elements of an antenna array to provide measurements necessary to estimate the phase difference between transmit and/or receive paths of the various antenna elements. This is schematically illustrated in FIG. 3, in which a measurement signal is transmitted from a transmitter unit TxO of one antenna element, and received at the receiver unit Rx1 of another antenna element. Typically, the mutual coupling or transfer function between antenna elements is assumed to be known due to the physical dimensions of the antenna and/or measurements made in advance.

According to a general aspect, the current disclosure presents a method of phase calibrating the transmit and/or receive paths of antenna elements of an antenna array by transmitting a measurement signal on one or more antenna elements and receiving the transmitted measurement signal or a representation thereof at one or more of the remaining antennas. If the antenna is a unit with well defined geometry so that the coupling between different antenna elements can be measured once and stored, then the unknown transfer functions of the transmit paths and the receive paths can be measured by transmitting on one antenna element at a time and measuring on the others. By utilizing symmetry properties and/or reciprocity properties of the antenna array, as well as the previously mentioned mutual coupling or transfer function between the antenna elements, it is possible to compare measurements between a plurality of respective combinations of antenna elements and estimate a phase difference between the antenna elements, e.g. antenna elements with a same polarization. The estimated phase difference is subsequently used in order to calibrate the phase of the transmit and/or receive paths of the various antenna elements.

Figure 4:
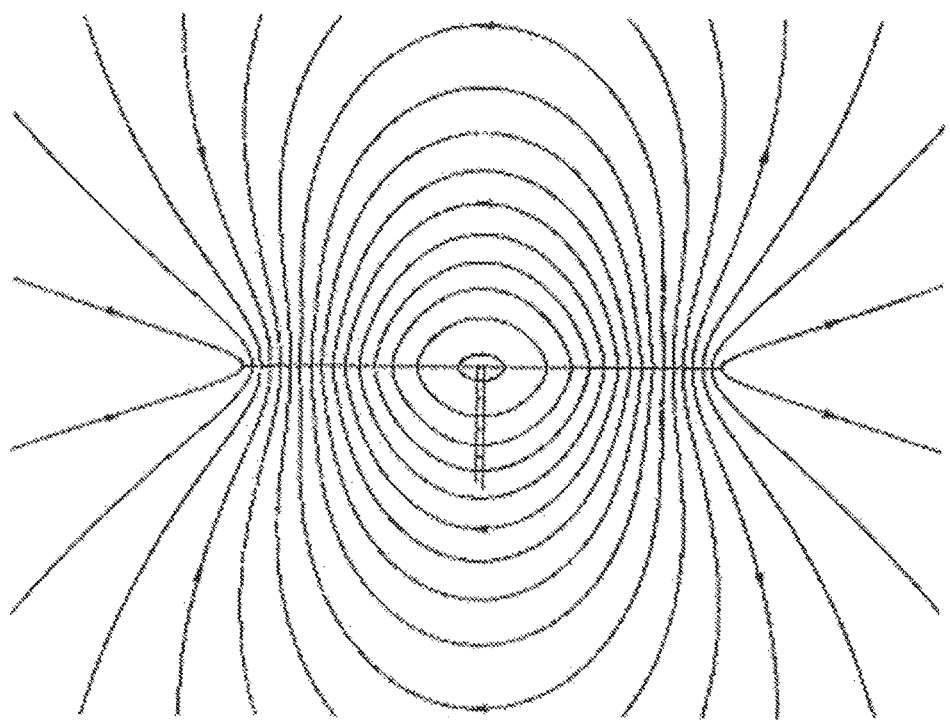
FIG. 4 illustrates the near field of a dipole antenna.

Because the antenna elements are located in the relatively near vicinity of each other, the transmission from one antenna element to another relies on near field transmission. The near field of a dipole antenna is shown in FIG. 4.

It is most important to have the same phase on antenna elements with the same polarization, since each polarization is independent and only affects the beam shape of the antenna separately. For the case of UE (user equipment) feedback based beam forming e.g. LTE TM4 it is acceptable to have phase errors or phase differences between antennas if it is the same error on both polarizations, something that UE feedback will correct for (PMI). In that case, it is possible to determine the phase difference without knowing the exact numerical value of the mutual coupling; consequently, fewer mutual coupling components need to be used if UE feedback is available.

Figure 5:
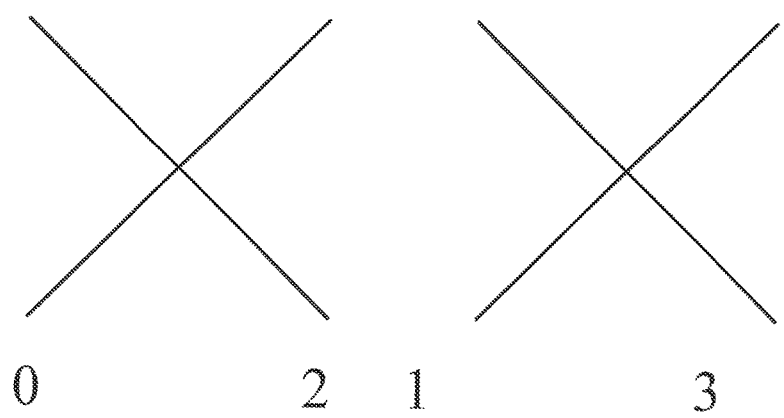
FIG. 5 illustrates a symbolic four-element antenna with cross-polarized antenna elements.

The present disclosure will be described mainly in the context of a four-element antenna comprising two cross-polarized antennas each with a first and second co-located antenna element with a respective first and second polarization, as illustrated in FIG. 5. In other words, the antenna includes two columns of antenna elements, each of which column comprises a dual polarized antenna element where each dual polarized antenna element includes a first antenna element polarized according to a first polarization and a second co-located antenna element polarized according to a second orthogonal polarization. Consequently, antenna elements 0 and 1 have a same polarization and antenna elements 2 and 3 have another orthogonal same polarization. However, it is equally applicable to any antenna array constellation including two or more such cross-polarized antennas. In particular, to an antenna with two or more columns of multiple such dual polarized antenna elements.

Figure 6:
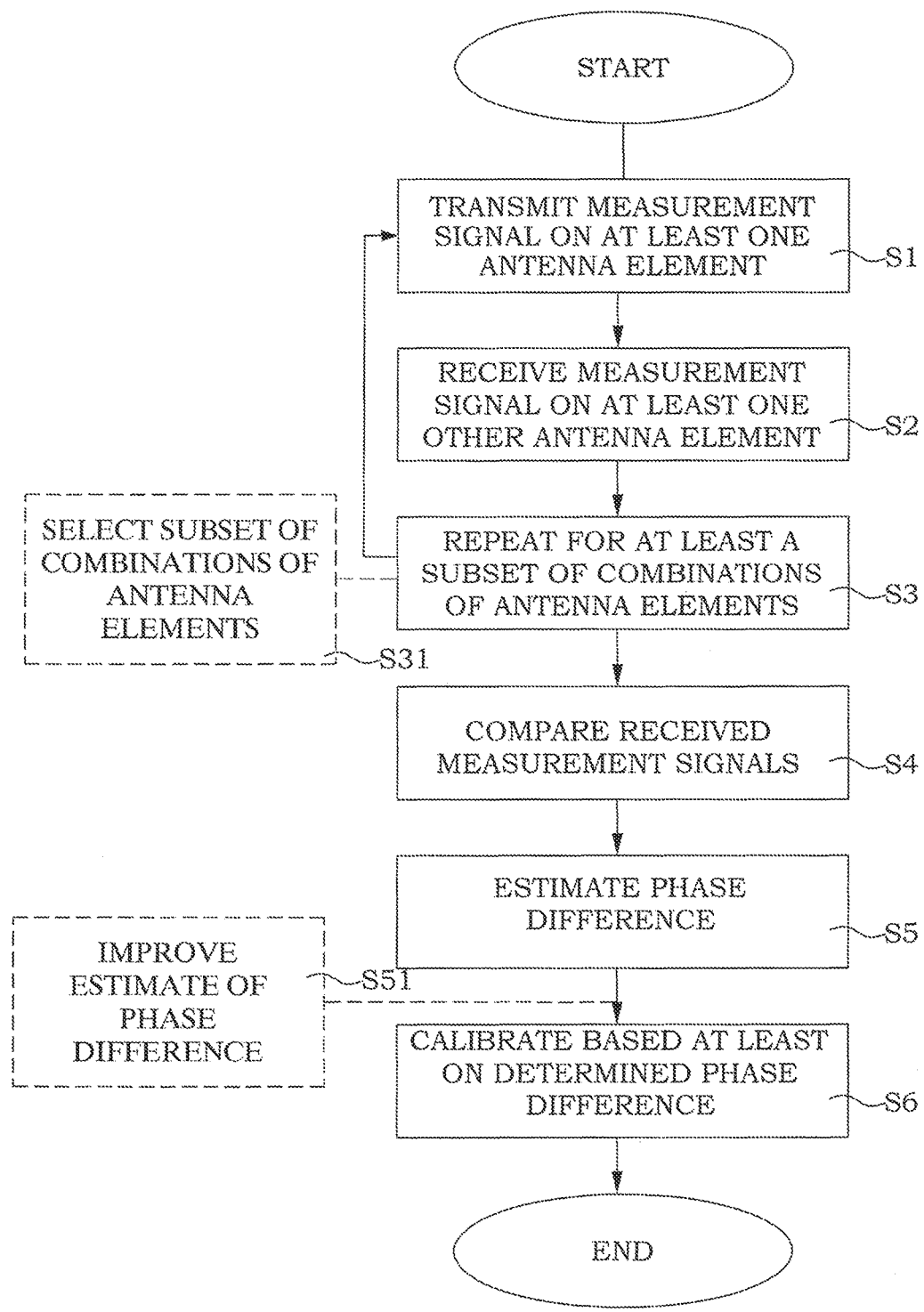
FIG. 6 illustrates embodiments of a method according to the present disclosure.

Basically, with reference to FIG. 6, the embodiments of the current disclosure include a method of calibrating the transmit and/or receive paths of antenna elements of an antenna array comprising at least two dual polarized antennas, each such dual polarized antenna comprising a respective first antenna element (0; 1) with a first polarization and a respective second antenna element (2; 3) with a second polarization, each antenna element is connected to a respective transceiver device via a respective feeder network. Typically, the feeder network includes at least feeder cables, and optionally associated elevation beam former components such as N-way couplers, N-way splitters and various RF cable lengths. The embodiments of the current disclosure includes the steps of transmitting S1 a measurement signal on at least one of the antenna elements e.g. providing a measurement signal at one of the external connectors of the antenna and receiving S2 the transmitted measurement signal or a representation thereof on at the corresponding external connectors of at least one other of the antenna elements. The measurement signal can be provided by a separate measurement signal generator or as part of the normal function of a transmitter unit. The analyses can be performed by a separate measurement receiver or by the normal receiver unit.

The received measurement signal or representation thereof includes a transfer function for the channel between the two antenna elements, including a mutual coupling component between the transmitting antenna and the receiving antenna element, as well as the influence of all cables, beam formers and the like between the external connectors of the antenna elements. The steps of transmitting and receiving are subsequently repeated S3 for at least a subset of all combinations of antenna elements of the antenna array, and each combination of antenna elements includes two antenna elements having a same or a different polarization.

For the case of phase calibrating a transmitter path, it is typically necessary to transmit the measurement signal on two different transmit antennas and receive the measurement signal at one receive antenna. On the other hand, for the case of phase calibrating a receiver path, it is typically necessary to transmit the measurement signal on one transmit antenna and receive the measurement signal at two different receive antennas.

The received measurement signals are then compared S4 between different antenna element combinations. Based on the received transmitted measurement signal and the known mutual coupling component, at least a respective phase difference between at least two antenna elements having a same polarization can be estimated S5. Finally, the phase of each respective transmit and/or receive path for each antenna element is calibrated S6 to compensate for the determined phase difference. The actual phase compensation is typically performed by applying an inverse phase difference to one of the antenna elements with each polarization.

According to a particular embodiment, only the phase difference between elements of the same polarization are determined and calibrated for. According to yet a further embodiment, the layout of the antenna (e.g. reciprocity and symmetry properties) enables determining the respective phase differences without knowledge of the actual value of the mutual coupling component.

In the following, the term "known mutual coupling" is used to refer to a mutual coupling component that is known beforehand e.g. determined already during production of the antenna or antenna array, or based on the assumption that similar antenna geometries generate the same mutual coupling components, or determined after installation of the antenna at a particular location. This constitutes a case of using the mutual coupling component directly.

Figure 7:
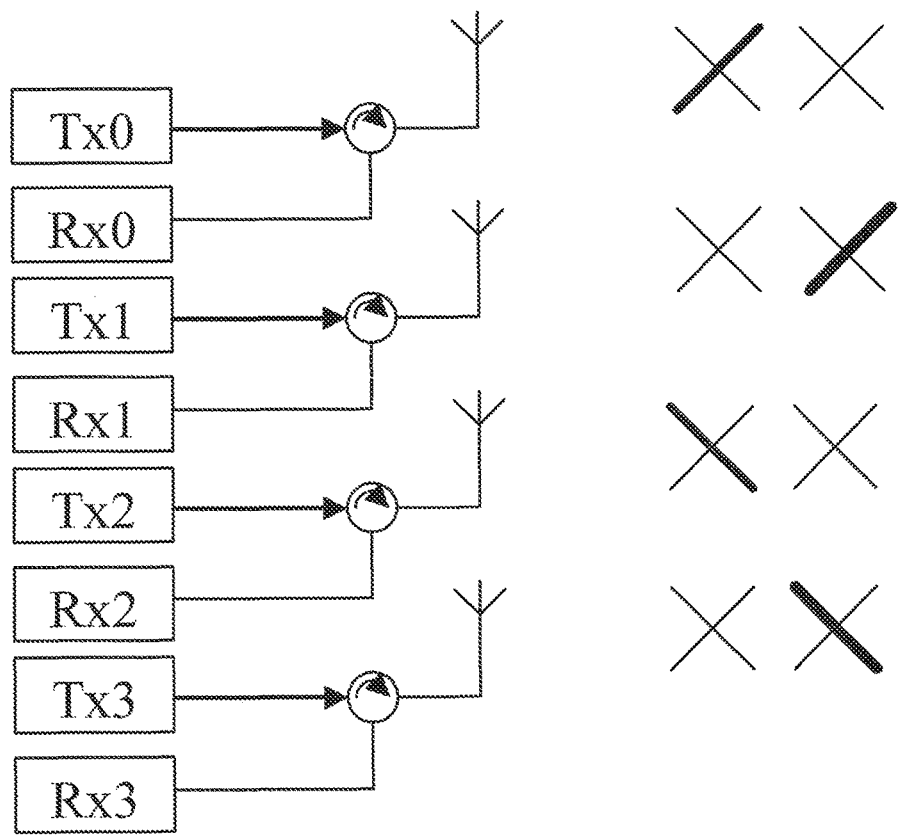
FIG. 7 illustrates a four-element antenna system in which the technology of the current disclosure can be implemented.

Below, the case of a four-element antenna will be discussed in detail with reference to FIG. 7. In such an antenna or antenna array there are 8 unknown transfer functions i.e. four transmitters and four receivers, $Tx_0 \ldots Tx_3$ and $Rx_0 \ldots Rx_3$. The mutual coupling components between the antenna elements, $C_{jk}$ are supposed to be known, measured either during production or after installation at a predetermined location.

The relation between a transmitting (j) and a receiving antenna element (k) is determined according to Equation 1 below.

$$Tx_j C_{jk} Rx_k = M_{jk} \qquad (1)$$

where $Tx_j$ denotes the transmitter unit connected to antenna j, and $Rx_k$ denotes the receiver unit connected to antenna k, and $M_{jk}$ is the results from the measurements, and $C_{jk}$ are constants depending on the mutual coupling between antenna elements j and k for a specific type of antenna. Those values are assumed to be known and stable over time and temperature and also the same between different samples of antennas of the same type.

For the case of a four-element antenna, where each transmitter unit can transmit to all receiver units, there are in total 4×3 potential measurements, resulting in 12 different equations, se Table 1 below. The equations are nonlinear and are not independent. It is therefore not possible to calculate all unknowns; however, it is still possible to calculate the wanted phase difference between transmit and/or receive paths of antenna elements of the same polarization.

TABLE 1

All possible measurements between four antenna elements

| Nr | From | To | Measurement | Measurement result |
|---|---|---|---|---|
| 0 (*) | $Tx_0$ | $Rx_1$ | $Tx_0 * C_{01} * Rx_1$ | $M_{01}$ |
| 1 | $Tx_0$ | $Rx_2$ | $Tx_0 * C_{02} * Rx_2$ | $M_{02}$ |
| 2 | $Tx_0$ | $Rx_3$ | $Tx_0 * C_{03} * Rx_3$ | $M_{03}$ |
| 3 (*) | $Tx_1$ | $Rx_0$ | $Tx_1 * C_{10} * Rx_0$ | $M_{10}$ |
| 4 | $Tx_1$ | $Rx_2$ | $Tx_1 * C_{12} * Rx_2$ | $M_{12}$ |
| 5 | $Tx_1$ | $Rx_3$ | $Tx_1 * C_{13} * Rx_3$ | $M_{13}$ |
| 6 | $Tx_2$ | $Rx_0$ | $Tx_2 * C_{20} * Rx_0$ | $M_{20}$ |
| 7 | $Tx_2$ | $Rx_1$ | $Tx_2 * C_{21} * Rx_1$ | $M_{21}$ |
| 8 (*) | $Tx_2$ | $Rx_3$ | $Tx_2 * C_{23} * Rx_3$ | $M_{23}$ |
| 9 | $Tx_3$ | $Rx_0$ | $Tx_3 * C_{30} * Rx_0$ | $M_{30}$ |
| 10 | $Tx_3$ | $Rx_1$ | $Tx_3 * C_{31} * Rx_1$ | $M_{31}$ |
| 11 (*) | $Tx_3$ | $Rx_2$ | $Tx_3 * C_{32} * Rx_2$ | $M_{32}$ |

Each measurement typically is a broadband measurement consisting of a set of simultaneous measurements at different frequency points. Each frequency point can be handled independently. All of the following equations are assumed to apply for every frequency point.

As mentioned previously, it is most important to calibrate the phase difference between the transmit and/or receive paths of antenna elements with the same polarization i.e. between element 0 and 1 and between 2 and 3 in FIG. 5. Consequently, it is necessary to calculate, estimate or determine the phase difference $\Delta\varphi_{jk}$.

Since it is most important to calibrate phase differences between antenna elements of the same polarization e.g. elements 0 and 1, and elements 2 and 3, not all measurements are equally important. There are 8 of the measurements that are more important or useful than the others, as indicated in Table 2 below.

TABLE 2

Necessary subset of measurements

| Nr | From | To | Measurement | Measurement result |
|---|---|---|---|---|
| 1 | $Tx_0$ | $Rx_2$ | $Tx_0 * C_{02} * Rx_2$ | $M_{02}$ |
| 2 | $Tx_0$ | $Rx_3$ | $Tx_0 * C_{03} * Rx_3$ | $M_{03}$ |
| 3 | $Tx_1$ | $Rx_2$ | $Tx_1 * C_{12} * Rx_2$ | $M_{12}$ |
| 4 | $Tx_1$ | $Rx_3$ | $Tx_1 * C_{13} * Rx_3$ | $M_{13}$ |
| 5 | $Tx_2$ | $Rx_0$ | $Tx_2 * C_{20} * Rx_0$ | $M_{20}$ |
| 6 | $Tx_2$ | $Rx_1$ | $Tx_2 * C_{21} * Rx_1$ | $M_{21}$ |
| 7 | $Tx_3$ | $Rx_0$ | $Tx_3 * C_{30} * Rx_0$ | $M_{30}$ |
| 8 | $Tx_3$ | $Rx_1$ | $Tx_3 * C_{31} * Rx_1$ | $M_{31}$ |

The phase difference or phase error $\Delta\varphi_{jk}$ between two transmitter branches can be expressed according to Equations 2-4 below.

$$\Delta\varphi = \arg(Tx_j) - \arg(Tx_k) = \arg(Tx_j/Tx_k) \qquad (2)$$

where $$\arg(x) = \arctan\left(\frac{\mathrm{imag}(x)}{\mathrm{real}(x)}\right) \qquad (3)$$

$$\Delta\Phi_{jk} = \arg(Tx_j)\arg(Tx_k) \text{ for } j = 0, k = 1 \text{ and } j = 2, k = 3 \qquad (4)$$

In order to estimate the phase relation between co-polarized elements 0 and 1, the relations of Equation 5 and 6 can be used. Consequently, the phase difference or error $\Delta\varphi_{01}$ can be calculated by first calculating the quota according to Equation 5 based on measurements 5 and 2 from Table 2:

$$\frac{Tx_0}{Tx_1} = \frac{C_{13} \cdot M_{03}}{C_{03} \cdot M_{13}} \qquad (5)$$

or by utilizing measurements 4 and 1 from Table 2 and calculating the quota according to Equation 6 below $$\frac{Tx_0}{Tx_1} = \frac{C_{12} \cdot M_{02}}{C_{02} \cdot M_{12}} \qquad (6)$$

or utilizing an average of the above two results. Thereby the requested phase error can be determined according to Equation 7.

$$\Delta\Phi_{01} = \arg\left(\frac{Tx_0}{Tx_1}\right) \qquad (7)$$

where arg(x) denotes the four quadrant $$\arctan\left(\frac{\mathrm{imag}(x)}{\mathrm{real}(x)}\right)$$

In a corresponding manner, the phase relation between co-polarized elements 2 and 3 can be determined according to the following.

The phase difference $\Delta\varphi_{23}$ between antenna elements 2 and 3 can e.g. be calculated in a similar way by first calculating the quota of Equation 7 below, based on measurements 9 and 6:

$$\frac{Tx_2}{Tx_3} = \frac{C_{30} \cdot M_{20}}{C_{20} \cdot M_{30}} \tag{7}$$

or by utilizing Equation 8 below, based on measurements 10 and 7

$$\frac{Tx_2}{Tx_3} = \frac{C_{31} \cdot M_{21}}{C_{21} \cdot M_{31}} \tag{8}$$

or by calculating an average of the two.

As mentioned previously, all measurements are not necessarily used. Measurements between antennas with the same polarization are not necessary if phase alignment only is required between antennas of the same polarization. Measurement 0, 3, 8 and 11, marked with (*) in Table 1, are thus not typically necessary to perform.

Figure 8:
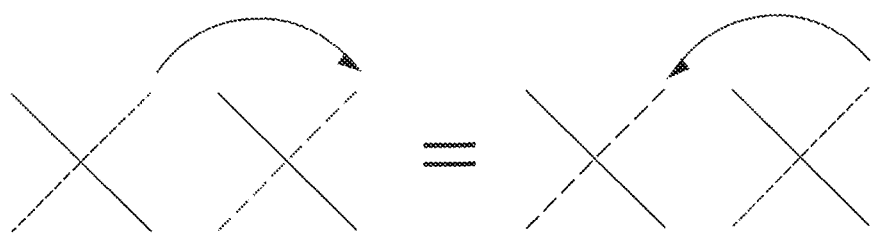
FIG. 8 illustrates the reciprocity of antenna elements.
Figure 8:
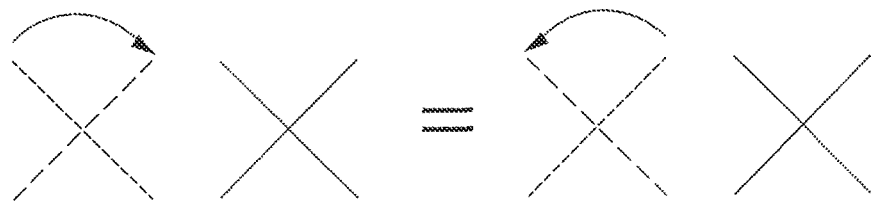
Figure 9:
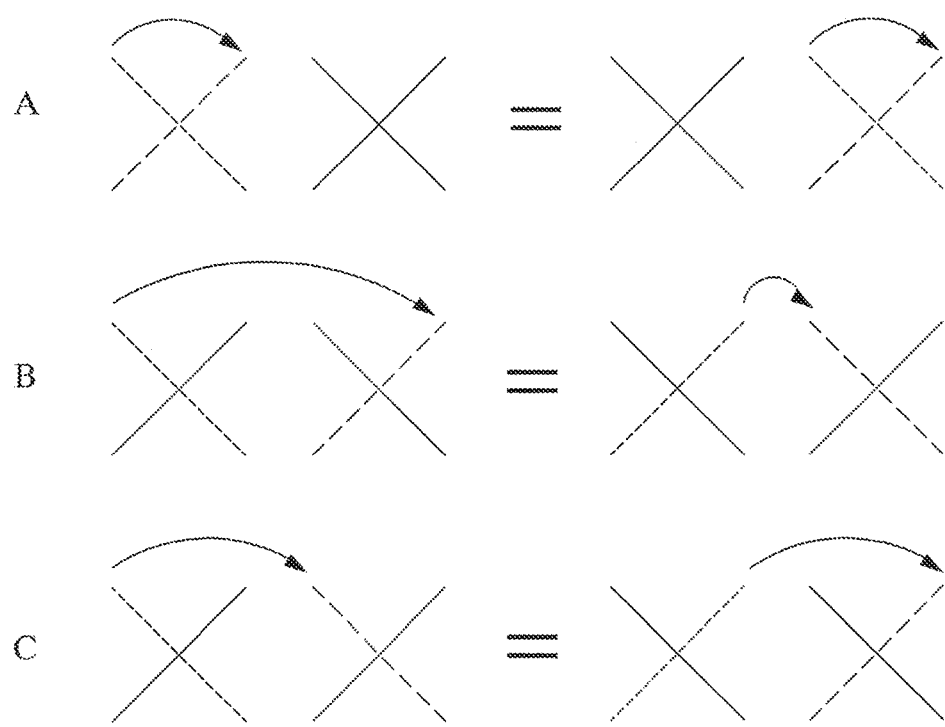
FIG. 9 illustrates symmetry properties of a four-element antenna array.

Due to geometrical properties of the antenna, some of the mutual coupling factors might have some symmetry properties such as geometrical symmetry as well as the so-called reciprocity from antenna element 0 to 1 compared with 1 to 0. In this context, the phrase "geometrical symmetry" indicates that antenna elements have some symmetrical arrangement in the antenna array, thus indicating the possibility to assume that elements with a similar geometrical arrangement have a corresponding mutual coupling factor. Reciprocity is typically not related to the actual geometry of the antenna array, but rather the symmetrical nature of a radio channel e.g., there is no difference in the channel with regard to direction between two antenna elements. In other words, reciprocity means that the radio channel from one antenna to another antenna is the same in both directions. This is true regardless of if the antenna itself is symmetric. This can be expressed according to the following relation in Equation 9, as well as illustrated in FIG. 8 and FIG. 9.

$$C_{jk} = C_{kj} \tag{9}$$

If both those "symmetries", e.g. geometrical symmetry and reciprocity, are used it would not be necessary to know the mutual coupling in advance. It is actually only necessary to use symmetry of type A and B, as indicated in FIG. 9, together with the reciprocity property.

Below follows a non-limiting example where the symmetry and reciprocity properties are used in combination.

If the quota $$\frac{C_{13}}{C_{03}}$$

between $C_{13}$ and $C_{03}$ is denoted K, and as $C_{13} = C_{02}$ and $C_{03} = C_{12}$ due to symmetry then the relation of Equation 10 below is achieved.

$$\frac{C_{12}}{C_{02}} = \frac{1}{K} \tag{10}$$

Together with the results from Equation 5 and Equation 6 this results in Equation 11 below:

$$K \cdot \frac{M_{03}}{M_{13}} = \frac{1 \cdot M_{02}}{K \cdot M_{12}} \tag{11}$$

The quota K can be calculated according to Equation 12

$$K = \sqrt{\frac{M_{02} \cdot M_{13}}{M_{12} \cdot M_{03}}} \tag{12}$$

Further, the quota K can also be calculated from Equation 7 and Equation 8 as $$K = \sqrt{\frac{M_{20} \cdot M_{31}}{M_{30} \cdot M_{21}}},$$

thus indicating that the system is over determined and $\Delta\varphi_{01}$ and $\Delta\varphi_{23}$ can be calculated in two different ways.

In Equation 5 and Equation 6, it is possible to insert the expression for K instead of the unknown mutual couplings and in a similar way for Equation 7 and Equation 8.

Finally, the phase difference between antenna elements 0 and 1 is calculated according to Equation 13 below:

$$\Delta\Phi_{01} = \arg\left(\sqrt{\frac{M_{02} \cdot M_{03}}{M_{12} \cdot M_{13}}}\right) \tag{13}$$

and the phase difference between antenna elements 2 and 3 is calculated as:

$$\Delta\Phi_{23} = \arg\left(\sqrt{\frac{M_{20} \cdot M_{21}}{M_{30} \cdot M_{31}}}\right) \tag{14}$$

This estimation is not dependent on any knowledge of the mutual coupling but relying on some symmetry properties of the mutual coupling that may or may not exist in the antenna.

The above-described example requires a more or less perfectly symmetrical antenna array, which is usually not the case for real antenna arrays. Consequently, geometrical symmetry is typically not a reliable characteristic when determining phase differences between antenna elements. According to a further aspect of the current disclosure, for some cases such as asymmetric antenna arrays, it is therefore not possible to utilize any symmetry. However, the previously discussed reciprocity is a general feature of a radio channel and is not dependent on whether the antenna design is symmetric or not and is still useful to estimate the phase difference according to the present disclosure.

Below will follow an embodiment in which only the reciprocity properties of an antenna array are utilized according to the present disclosure.

The transfer function between co-located elements e.g. 0 and 2 or 1 and 3 as indicated in FIG. 5 might be unpredictable and very dependent on antenna design due to that they are orthogonally positioned. However, if there is phase error between two antennas with the same polarization this can still be acceptable provided that it is the same phase difference on the other polarization. This is because this will be reported by the UE using the PMI report and will be compensated for in the precoding.

If e.g. Equation 6 and Equation 7 are used to calculate $\Delta\varphi_{01}$ and $\Delta\varphi_{23}$, the mutual coupling $C_{02}$ or $C_{20}$ similar due to reciprocity, will affect the result the same way. An error in $C_{02}$ will give the same error in both polarizations which is not a problem according to the discussion above. It is possible to set $C_{02}$ and $C_{20}$ to an arbitrary value e.g. 1.0. The same will happen if Equation 5 and Equation 8 are used. In this case it is possible to utilize the reciprocity between $C_{13}$ and $C_{31}$ and note that they also cause a common phase error.

It is only necessary to know $C_{12}$ and $C_{03}$ and the results are independent of the uncertain coupling between the orthogonally mounted elements.

Consequently, two methods to calculate $\Delta\varphi_{01}$ and $\Delta\varphi_{23}$ have been presented. One is dependent on $C_{03}$ and the other is depending on $C_{21}$. Both shall give the same result.

Method 1:
Based on $$\frac{Tx_0}{Tx_1} = \frac{C_{12} \cdot M_{02}}{1 \cdot M_{12}} \text{ and } \frac{Tx_2}{Tx_3} = \frac{C_{30} \cdot M_{20}}{1 \cdot M_{30}}$$

Method 2:
Based on $$\frac{Tx_0}{Tx_1} = \frac{1 \cdot M_{03}}{C_{03} \cdot M_{13}} \text{ and } \frac{Tx_2}{Tx_3} = \frac{1 \cdot M_{21}}{C_{21} \cdot M_{31}}$$

Figure 10:
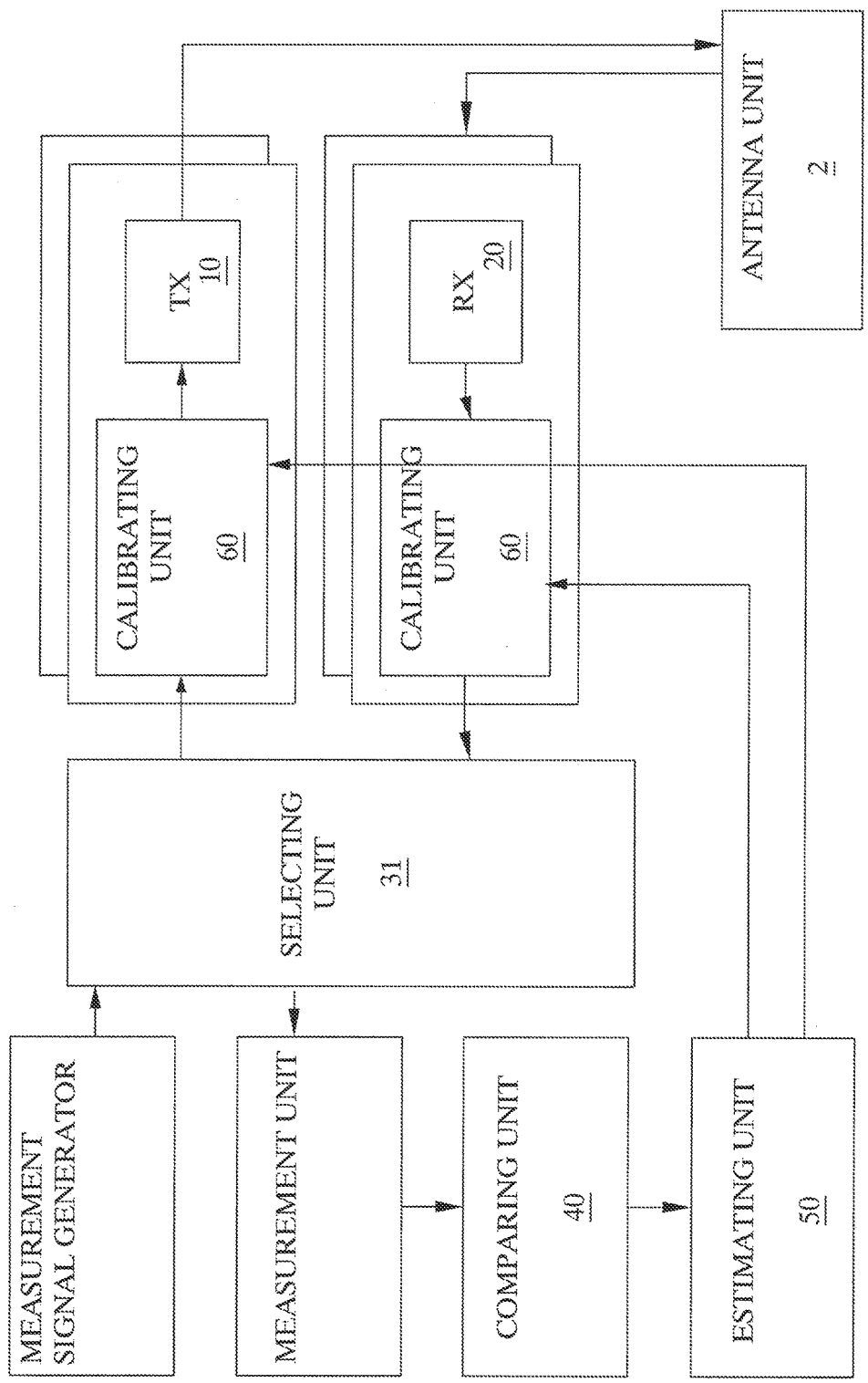
FIG. 10 illustrates an embodiment of an arrangement according to the current disclosure.
Figure 11:
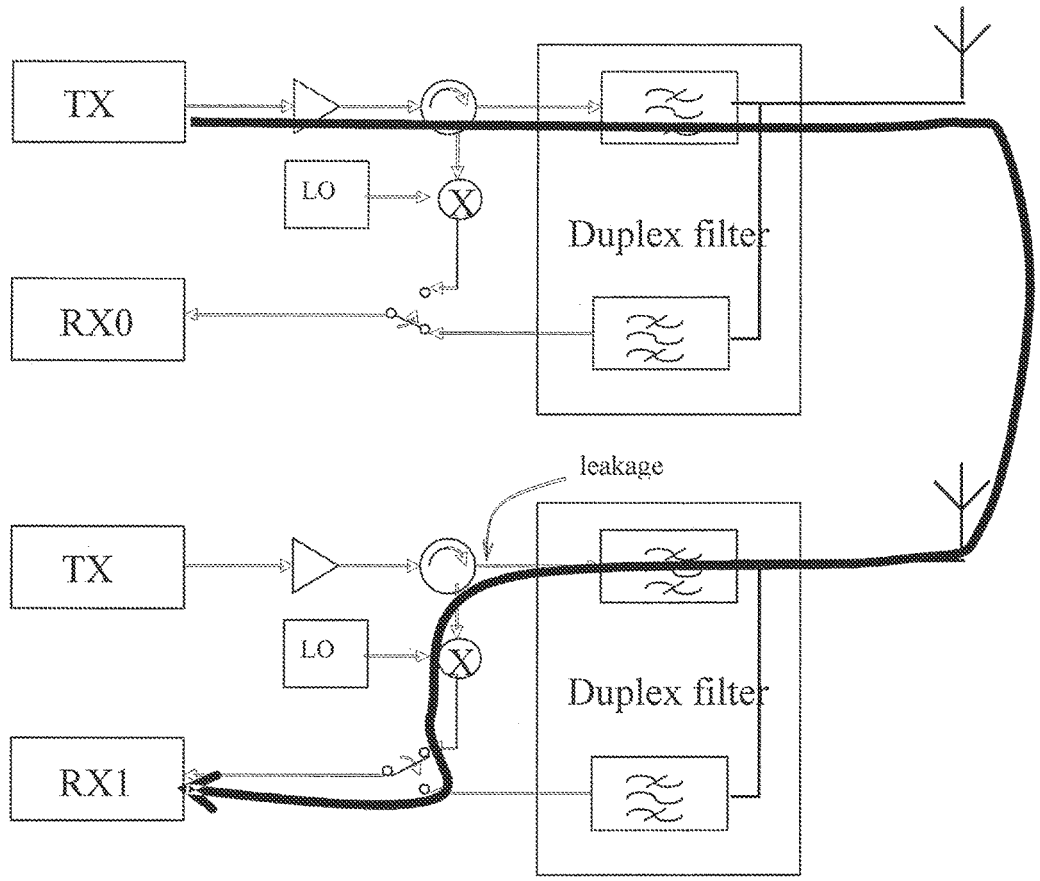
FIG. 11 illustrates an embodiment of the current disclosure for phase calibration in a FDD system.

With reference to FIG. 10, an embodiment of an arrangement configured for implementing the above-mentioned embodiments of a method for calibrating transmit and/or receive paths of an antenna or antenna array will be described. The arrangement 1 is connected to and is in communication with the external connectors of an antenna or antenna array 2. The antenna array is configured according to the previous description with relation to FIG. 3. Thereby, the antenna array 2 includes at least two antenna columns, each of which comprises two co-located sub-arrays of antenna elements, one sub-array comprising at least a first antenna element 0; 1 with a first polarization and one sub-array comprising at least a second antenna element 2; 3 with a second polarization, and each said antenna element being connected to a respective transceiver device 10; 20 via a respective feeder network. Accordingly, the arrangement 1 includes a plurality of such transceiver units 10, 20 associated with the antenna elements of the antenna 2, each transceiver unit 10, 20 including a transmit unit 10 and a receive unit 20. Each transmit unit 10 is configured for enabling transmitting a measurement signal from at least one respective antenna element to any other at least one or a plurality of antenna element in the antenna array 2, and each receive unit 20 is configured for enabling receiving a representation of the measurement signal at a respective antenna element from any other antenna element in the antenna array 2. As described with relation to the method of the current disclosure, the received representation of the measurement signal includes at least a mutual coupling component dependent on the mutual coupling between the at least one antenna element and said at least one other antenna element. Further, the transmitting unit 10 and said receiving unit 20 are configured for repeating the transmitting and receiving step for at least a subset of all combinations of antenna elements of the antenna array. Each such combination of antenna elements comprises antenna elements having a same 0, 1; 1, 0; 2, 3; 3, 2 or different 0, 2; 0, 3; 2, 0; 3, 0; 2, 1; 1, 2; 1, 3; 3, 1 polarization.

According to a further embodiment, the arrangement includes a measurement signal generator configured for generating the measurement signal and providing it at the external connectors of the antenna array.

Further, the arrangement 1 includes a comparing unit 40, which is configured for comparing the received representations of the measurement signal, and an estimating unit 50 configured for estimating a respective phase difference between antenna elements with the same polarization based on the comparison. Finally, the arrangement includes a calibrating unit 60 configured for calibrating transmit and/or receive paths of antenna elements with said same polarization based on the estimated phase difference.

Optionally, and since not all measurements are necessary for enabling determining the phase difference between antenna elements, the arrangement 2 according to a further embodiment includes an optional selecting unit 31. The selecting unit 31 is configured for determining and selecting which subset of measurements that are necessary, and actuate the calibration process based on the selected subset. As described with relation to the calibration method, the remaining measurements can be utilized in order to improve the accuracy of the calibration.

The arrangement 2 of the present disclosure is beneficially implemented in a network node such as a base station in a wireless communication system.

Consequently, it is possible to utilize the already present transceivers to perform the tasks of effecting the measurements of the current disclosure.

Although the present disclosure is described mainly for the case of TDD downlink, it is equally applicable to FDD with some minor adjustments. For the case of FDD, the frequencies on the downlink and the uplink are different, thus necessitating introducing a frequency shift when comparing the measurements according to the present disclosure. This can be done by introducing e.g. a mixer shifting the DL band by the duplex distance, i.e. the frequency distance between UL and DL. The mixer will however affect the phase of the measured signal. To be able to compare phases the phase of the mixer local oscillator (LO) needs to be well defined during the measurement. Either the LO is synchronized with the measurement so that the phase is known or several measurements are performed simultaneously so that the phase of the LO will be the same for all the measurements and not affecting the phase difference between antenna elements. The above-mentioned simultaneous measurements can be affected by transmitting orthogonal signals e.g. with different frequency, on different antennas, thus enabling separation of the signals at a receiver.

Figure 12:
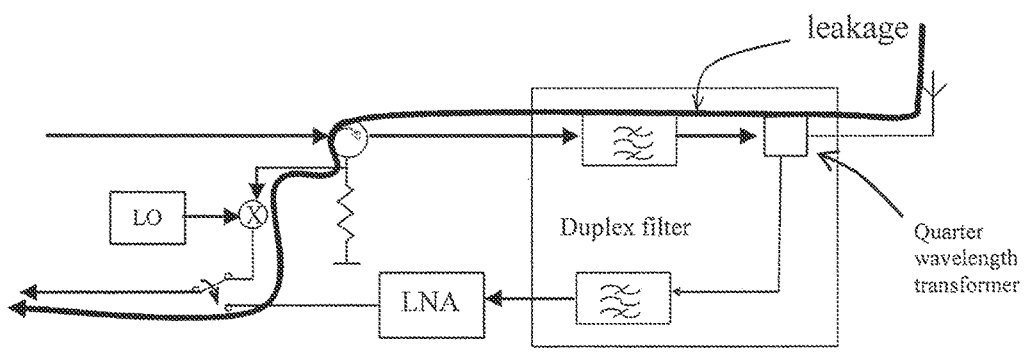
FIG. 12 illustrates extraction of a measurement signal in an embodiment of the current disclosure for phase calibration in a FDD system.

A further necessary consideration in a FDD radio, is caused by the presence of duplex filters that are designed to prevent transmitter frequencies to enter the receive path. According to the present disclosure, this can be achieved by extracting the measurement signal at the input of the transmit filter of the duplex filter, as illustrated in FIG. 12. Alternatively, the alternative would be to access the calibration signals on the antenna side of the duplex filter. In this case, the signal will be unfiltered and suffer from disturbances from other frequencies.

For a particular embodiment, with reference to FIG. 13, there is a quarter wavelength transformer on the antenna side of the filter that is supposed to stop signals from going back through the transmit filter. This unit has attenuation for signals going into the transmitter of around 20 dB. This is however not a problem for the calibration signal as this is a high-level signal. At the radio side of the filter there is a circulator and a termination resistor. The purpose of this circuit is to protect the PA (Power Amplifier) from signals reflected back if e.g. the output impedance is wrong due to a faulty antenna. The circulator will forward the output signal from the PA to the filter but signals going in the opposite direction will be directed to the termination resistor. The received calibration signal will also be sent to the termination and the signal can be extracted over the resistor. The normal transmit filter serves as a receive filter and it is not required to have access to the antenna side of the duplex filter. The LO and a mixer will move the signal to the receiver frequency band. A switch is used to temporarily select this signal as input to the receiver instead of the normal UL signal, in case one of the receivers is used for measurements.

According to the present disclosure, the transmitted measurement signal is detected as a backwards leakage through the duplex transmitter filter. The received measurement signal can be switched to the receiver frequency band upon detection. This is preferably enabled by use of a switch, which is configured to temporarily select the leaking signal as input to the receiver instead of the normal UL signal. Another embodiment includes modifying the UL LO frequency and detuning it such that the leaked signal is within the UL frequency band.

The transmitted signal, usually high power, must not overload the receiver. If the signal is inserted after the LNA (Low Noise Amplifier) there will not be any switches in the signal path in front of the LNA. Any additional circuits in front of the LNA would otherwise increase the receiver noise during UL reception.

With some extra switches the LO and mixer HW could be reused by all receivers. This would however hinder the possibility to measure on several antenna elements simultaneously.

It might also be possible to modify the frequency of the UL LO and detune it so that the calibration signal falls into the UL frequency band. In that case no separate mixer is needed.

At least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Advantages of the present disclosure includes that phase calibration is possible for antennas without a dedicated calibration port and without an external separate dedicated CCU. No phase stable feeder cables required, as is the case when a CCU is implemented in the radio. A minimum of extra hardware is required in the radio. The present disclosure supports both TDD and FDD systems.

In summary, the present disclosure includes a transmitter/receiver device configured for phase calibrating the antenna elements of an antenna array. The transmitter/receiver includes a unit for configuring and initializing a measurement signal to be transmitted between at least two of the antenna elements. Further, the device includes a unit for detecting a received measurement signal at a plurality of antenna elements of the antenna array. In addition, the device includes a unit configured for determining a phase difference between at least two antenna elements based on the received measurement signals. Finally, the device includes a unit configured for calibrating the phase of the antenna elements based on the determined phase differences. The antenna array is preferably a four element antenna array, but also larger multi element antennas are possible.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of calibrating transmit and/or receive paths of an antenna comprising at least two antenna columns, each of which comprises two co-located sub-arrays of antenna elements, one sub-array comprising at least one antenna element with a first polarization and one sub-array comprising at least one antenna element with a second polarization, and each said antenna element being connected to a respective transceiver device in a network node via a respective feeder network, said method comprising:
   transmitting a measurement signal on at least one of said antenna elements;
   receiving a representation of said measurement signal on at least one other of said antenna elements, said representation comprising at least a mutual coupling component dependent on the mutual coupling between said at least one antenna element and said at least one other antenna element;
   repeating said transmitting and receiving step for at least a subset of all combinations of antenna elements of said antenna, wherein each combination of antenna elements comprises antenna elements having a same or different polarization;
   comparing said received representations of said measurement signal between different combinations of antenna elements; and
   estimating at least a respective phase difference between antenna elements with the same polarization based on said comparison;
   calibrating transmit and/or receive paths of antenna elements with said same polarization based on said estimated phase difference.

2. The method according to claim 1, further comprising selecting said subset of combinations based on reciprocity properties of said antenna elements.

3. The method according to claim 2, wherein the step of repeating comprises the further step of selecting said subset of combinations based on both symmetry properties of said antenna and reciprocity properties of said antenna elements.

4. The method according to claim 3, wherein said subset of combinations is selected based on symmetry properties of said antenna elements, and said mutual coupling component being an unknown mutual coupling component, and said respective phase difference is estimated based on an assumed mutual coupling component and said measurement signal.

5. The method according to claim 2, said mutual coupling component being a known mutual coupling component.

6. The method according to claim 1, said subset comprising all combinations of transmitting and receiving antenna elements and utilizing a first subset of measurements for estimating said phase difference and a second subset for improving the accuracy of the estimated phase difference.

7. The method according to claim 6, further comprising the step of comparing a phase difference determined by the subset of measurements to the phase difference with improved accuracy and detecting a faulty antenna element in case the comparison yields a difference larger than a predetermined threshold.

8. The method according to claim 1, said network node utilizing FDD and said receiving step comprising extracting said representation of said measurement signal at a radio side of a transmitter section of a duplex filter in a transceiving unit.

9. An arrangement for calibrating transmit and/or receive paths of an antenna comprising at least two antenna columns, each of which comprises two co-located sub-arrays, one sub-array comprising a first antenna element with a first polarization and one sub-array comprising a second antenna element with a second polarization, said arrangement comprising:
a plurality of transceiver devices, wherein:
each said antenna element is connected to a respective one of the plurality of transceiver devices via a respective feeder network;
each said transceiver device is configured for transmitting a measurement signal on at least one of said antenna elements; and
each said transceiver device is configured for receiving a representation of said measurement signal on at least one other of said antenna elements, said representation comprising at least a mutual coupling component dependent on the mutual coupling between said at least one antenna element and said at least one other antenna element, wherein said transceiver device being configured for repeating said transmitting and receiving for at least a subset of all combinations of antenna elements of said antenna array, wherein each combination of antenna elements comprises antenna elements having a same or different polarization,
comparing means configured to compare said received representations of said measurement signal;
estimating means configured to estimate a respective phase difference between antenna elements with the same polarization based on said comparison; and
calibrating means configured to calibrate transmit and/or receive paths of antenna elements with said same polarization based on said estimated phase difference.

10. The arrangement according to claim 9, further comprising selecting means configured to select said subset of combinations based on reciprocity properties of said antenna elements.

11. The arrangement according to claim 10, wherein the selecting means is further configured to select said subset of combinations based on both symmetry properties of said antenna, and reciprocity properties of said antenna elements.

12. The arrangement according to claim 11, said mutual coupling component being an unknown mutual coupling component, and said estimating means being configured to estimate a respective phase difference based on an assumed mutual coupling component and said measurement signal.

13. The arrangement according to claim 10, said subset of antenna elements comprising all combinations of transmitting and receiving antenna elements and said estimating means being configured for utilizing measurements not necessary for estimating the phase difference to improve the accuracy of the estimated phase difference.

14. The arrangement according to claim 13, said estimating means being further configured to compare a phase difference estimated by the subset of measurements to the phase difference with improved accuracy and to detect a faulty antenna element in case the comparison yields a difference larger than a predetermined threshold.

15. A network node comprising an arrangement according to claim 10.

16. The arrangement according to claim 9, wherein said mutual coupling component is a known mutual coupling component.

* * * * *